Patented July 3, 1951

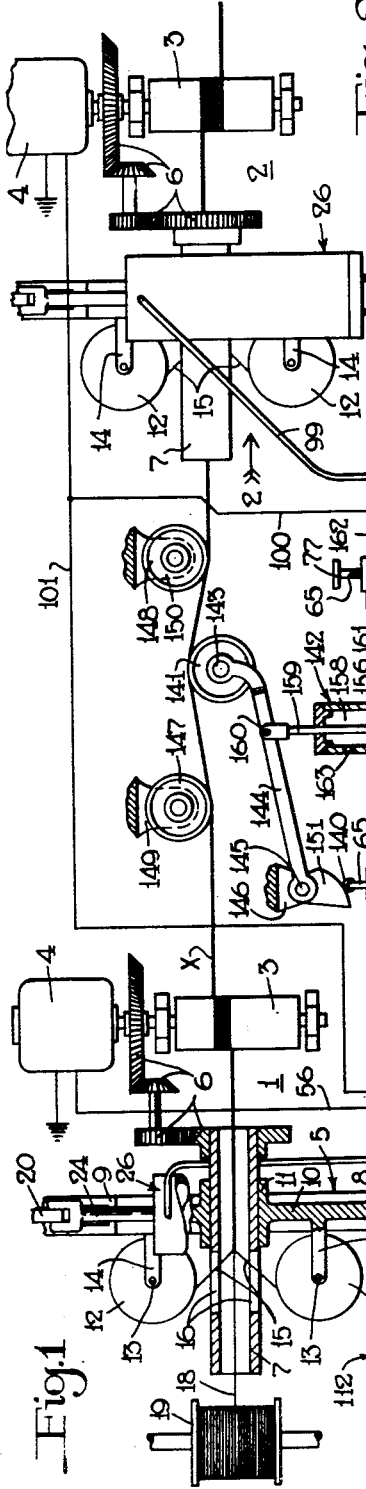

2,558,885

UNITED STATES PATENT OFFICE 2,558,885

BRAKE CONTROL APPARATUS

Roy R. Stevens, Forest Hills, and Ralph C. Brooks, Patton Heights, Pa., assignors to The Westinghouse Air Brake Company, Wilmerding, Pa., a corporation of Pennsylvania Application June 12, 1948, Serial No. 32,706

9 Claims. (Cl. 57—78)

This invention relates to brake control apparatus and more particularly to apparatus for controlling brakes such as on wire stranding machines adapted to be operated either individually or in tandem.

It is proposed that two wire stranding machines operable by separate power means such as electric motors be adapted for either individual or tandem operation. In individual operation, each machine operates independently of the other and cable formed on each may be wound on a spool as a finished product, or the cable formed by the one later may be unwound from its spool and fed into the other machine as a core for addition of strands to form a finished product. In tandem operation, the cable formed on one machine serving as a core, is fed continuously into the other machine for addition of strands to form a finished product. Both machines require brakes for stopping same when desired.

It is one object of the invention to provide brake controlling apparatus for controlling braking of two wire stranding machines when operating either individually or in tandem.

In individual operation of each machine, once the motor driving is cut off, it is highly desirable to effect automatic application of the brake or brakes on the machine in order that inertia will not cause unintentional running of the machine beyond a tolerable limit, and it is another object of the invention to provide brake control apparatus which will effect such an application.

In braking the two machines when operating in tandem, it is essential that both machines be slowed down at substantially the same rate, or, in other words, the speed of one relative to the speed of the other does not change substantially. If the second machine should be slowed down faster than the first machine, the resultant overspeed of the first relative to the second would cause overtravel of the cable running between the two machines. Such overtravel, if allowed to become excessive, would result in looping or twisting of the cable, and might result in serious damage or injury to personnel and equipment. If the first machine should be slowed down faster than the second machine when operating in tandem, a pulling or tension force would be exerted by the first machine on the cable traveling between the two machines. If this force were allowed to become excessive, damage or injury to personnel, equipment, or cable might result.

It is therefore a still further object of the invention to provide brake control apparatus for controlling operation of brakes on two wire stranding machines operating in tandem which automatically will assure substantially equal deceleration of said machines to prevent generation of excessive tension or looping of the cable traveling between said machines.

Other objects and advantages will become apparent from the following more detailed description of the invention.

In the accompanying drawing; Fig. 1 is a diagrammatic view, with certain parts in section and other parts in outline, of brake control apparatus associated with two wire stranding machines and embodying the invention; Fig. 2 is an elevational end view of a brake arrangement taken in the direction of arrow 2 in Fig. 1; Fig. 3 is a diagrammatic cross-sectional view of a self-lapping valve device comprised in the control apparatus shown in Fig. 1; and Fig. 4 is a schematic diagram of a controller device shown in Fig. 1.

Description

While the brake control apparatus which we have devised is suited for use in any number of different situations or applications, we have for purposes of illustration shown it as applied to the control of fluid pressure brakes on two wire stranding machines.

In order to understand our invention and its uses, therefore, it will be necessary to describe briefly the nature of the wire stranding machines.

Each of the machines 1, 2 may comprise a rotary element in the form of a capstan 3 which is adapted to be rotated by driving means such as an electric motor 4. A second rotary element 5 is coupled by means of gears 6 and a hollow shaft 7 for rotation by the motor 4 about an axis at right angles to the axis of rotation of the capstan 3. The rotary element 5 may comprise an outer cylindrical portion 8 which provides a surface for engagement by brake shoes 9 to effect deceleration and stopping of the machine. Portion 8 may be attached through an annular web 10 to a central hub 11 which is in turn secured to the hollow shaft 7 which may be rotatably mounted on suitable bearings (not shown). As well as serving as a brake drum for engagement by shoes 9, the rotary element 5 may serve to carry a plurality of reels 12 which may be rotatably mounted at opposite sides of the shaft 7 on a rod 13 between two spaced apart projecting elements 14 supporting opposite ends of said rods and attached to the web 10 of said rotary element. Wire 15 carried by reels 12 is fed through guide slots 16 in shaft 7 to the center thereof and looped around the capstan 3 along with a core which may be fed into one end of said shaft. In running operation of the machine, by rotation of capstan 3 the wires 14 are caused to unwind from reels 12 and pass axially out through one end of the hollow shaft 7 and around said capstan along with the above-mentioned core. While the wire 15 is thus unwinding from reels 12, by rotation of rotary element 5 which carries said reels, said wire is at the same time caused to twist around the core fed through the center of shaft 7 to form a multiple strand wire cable.

Since it may be desirable to operate each of the machines 1, 2 as a unit independent of the other, the driving means, motor 4, on the one is operable independent of the driving means, motor 4, on the other. In the drawing, however, in order to better illustrate certain features of the brake control apparatus embodying the invention, the two machines 1, 2 are shown set up for tandem operation, i. e., the cable may be formed on the one machine by twisting the strands of wire 15 about a core in the form of a wire 18 unwound from a reel 19 and said cable then fed continuously into the other machine to serve as a core onto which additional strands of wire 15 may be wound to form a still larger cable. Such an arrangement may be desirable as when a cable having a steel core may be wound on the first machine, with addition of wire strands of different metal added by the other machine. When each machine 1, 2 is operating as an individual unit, the second machine 2 will also be provided with a reel of wire or cable, similar to reel 19, to furnish a core around which the wires 15 may be twisted, since cable formed on the first machine would not then be fed directly or continuously into said second machine.

It will be appreciated that even during starting and running of the machines 1, 2 while operating in tandem, that means must be provided for assuring that the cable traveling continuously between said machines will not be too taut or too loose. Such means is beyond the scope of the present invention and has not been included herein. It will be assumed therefore that hereinafter when application of brakes on the machines when operating in tandem is described, that prior to said application any slack in the cable traveling from one machine to the other has been maintained relatively constant by any suitable means.

Referring to Fig. 2, for actuating the brake shoes 9 on the two machines, brake levers 20 may be provided, one for each shoe, which may be pivotally connected as their one end to a fixed member 21 by means of pins 22 or the like. The opposite ends of levers 20 may be pivotally connected, respectively, at 23 to one end of a brake cylinder piston rod 24 and at 25 to a casing of a brake cylinder 26. The shoes 9 are pivotally connected at 27 to the respective levers 20 intermediate the ends thereof. The piston rod 24 at its opposite end is attached to a brake cylinder piston 28 which is slidably disposed within the brake cylinder 26. At one side of piston 28 there is a pressure chamber 29 to which fluid under pressure may be supplied for effecting a brake application. At the opposite side of piston 28 there is a spring chamber 30 which is constantly open to atmosphere by way of a port 31 in the casing. A release spring 32 may be disposed in chamber 30 for effecting release of the brakes when fluid under pressure is vented from chamber 29. When fluid under pressure is supplied to chamber 29 it acts on one face of piston 28 and an end wall of brake cylinder 26 in such a manner as to urge the casing of said brake cylinder toward the left, as viewed in Fig. 2, and to urge said piston toward the right against the opposing action of spring 32. The brake levers 20 connected to piston 28 and brake cylinder 26, respectively, are thus urged inwardly toward the rotary element 5 to bring the shoes 9 into frictional engagement with the outer periphery of portion 8 thereof to effect a brake application on the respective machine. Upon release of fluid under pressure from chamber 29, through action of release spring 32 the casing of brake cylinder 26 is urged toward the right and piston 28 toward the left so that levers 20 are thereby urged outwardly and carry the shoes 9 away from the rotary element 5 to their rest or brake release position in which they are shown in the drawing.

The brake control apparatus embodying the invention comprises a magnet valve device 35 to serve as means for controlling application and release of the brake or brakes on the first wire stranding machine 1 only when both wire stranding machines 1 and 2 are set up for operation as independent individual units.

Only a symbol for a magnet valve device is shown in the drawing for sake of simplicity, such a device being well-known in the art. In magnet valve device 35, as well as in all subsequent magnet valve devices hereinafter referred to, when the magnet valve device is deenergized electrically, a fluid pressure communication indicated by a solid line 36 is established therethrough, and when electrical energy is supplied to opposite poles 37 to thereby energize said device, the fluid pressure communication 36 is disestablished and a fluid pressure communication indicated by a dashed line 38 is established. Subsequent deenergization of the magnet valve device disestablishes the previously established fluid pressure communication 38 and reestablishes communication 36. It will be understood hereinafter, therefore, that when one of the communications 36, 38 is established the other is disestablished.

Referring in particular to magnet valve device 35, opposite ends of communication 36 join pipes 39, 40, respectively, while one end of communication 38 joins the latter pipe 40 and the opposite end joins an exhaust pipe 41 which is open to the atmosphere. The pipe 39 has a connection with a relay valve device 42, which, during independent individual operation of the two wire stranding machines 1, 2, as will be described hereinafter, connects said pipe 39 with fluid under pressure from a source such as a fluid compressor (not shown) connected to a fluid pressure pipe 43 by way of a fluid pressure supply pipe 44 and its branches. The pipe 40 is connected by way of an adjustable self-lapping valve device 50, a pipe 51, a double check valve 52, and a pipe 53 to the pressure chamber 29 in the brake cylinder 26 on the wire stranding machine 1.

To effect automatic control of application of the brakes on the wire stranding machine 1 when same is set up for operation as an independent individual unit, one of poles 37 of the magnet valve device 35 is connected via a wire 55 to a wire 56 which is adapted to supply electrical energy to the motor 4 of said machine, while the opposite one of said poles 37 may be connected to ground. With such an arrangement, whenever electrical energy is supplied via wire 56 to motor 4 of machine 1 for running same, such electrical energy will be supplied simultaneously to magnet valve device 35 for energizing same. It will be seen, therefore, that while motor 4 of machine 1 is running, the pressure chamber 29 in the brake cylinder 26 is vented to atmosphere via pipe 53, double check valve 52, self-lapping valve device 50, pipe 40, the communication 38 in the energized magnet valve device 35, and exhaust pipe 41. When supply of electrical energy is cut off from motor 4 in machine 1 via wire 56, it at the same time will be cut off from magnet valve device 35 via wire 55, deenergizing same. Thus it will be seen that at the same time that motor 4 on machine 1 is cut off, through deenergization of magnet valve device 35, fluid under pressure in pipe 39 is supplied via communication 36 in said device, the pipe 40, self-lapping valve device 50, check valve 52, and pipe 53 to pressure chamber 29 in brake cylinder 26 for an automatic application of brakes on the machine 1 in manner as will be understood from previous description. Under conditions as set forth above, it will be seen that an application of brakes on the machine 1 will be effected automatically upon termination of supply of electrical energy to the driving motor for said machine, whether said termination be intentional or otherwise.

The adjustable self-lapping valve device 50 is provided for controlling the pressure supplied to the brake cylinder 26 on the wire stranding machine 1 during a brake application to control the degree thereof. The self-lapping valve device 50 is operable in response to fluid under pressure supplied to the pipe 40 to regulate pressure of fluid supplied to the pipe 51, hence via double check valve 52 and pipe 53 to the brake cylinder 26 on machine 1, in accordance with position of an adjustable stem 65. The stem 65 is adapted to be adjusted manually.

Referring to Fig. 3, the self-lapping valve device 50 may comprise a casing 66 having therein a supply chamber 67, a delivery chamber 68, a control chamber 69 and an exhaust chamber 70. A movable valve seat element 71 is arranged for movement by the stem 65 and is adapted to cooperate with a supply valve 72 for controlling communication between the supply chamber 67 and the delivery chamber 68. The supply valve 72 may be in the form of a ball disposed within a cavity 73 within the seat element 71. The cavity 73 may be open by way of ports 74 in one end to the supply chamber 67 and by way of a central opening 75 in its opposite end to the delivery chamber 68. A seat may be formed in one end of opening 75 against which supply valve 72 may seat to close off cavity 73, hence supply chamber 67, from delivery chamber 68. A bias spring 76 may be disposed in cavity 73 and arranged to urge the supply valve 72 toward its closed seated position. In the self-lapping valve device 50, the stem 65 may have a screw-threaded attachment with the casing 66 and be provided with a knurled knob 77 or the like, disposed outside for manual adjustment to screw said stem in or out of said casing. Thus the seat element 71 may be moved in the direction of chamber 68 or the opposite direction by adjustment of stem 65. A release valve seat element 78, secured for movement with deflection of a flexible diaphragm 79, is provided for accommodating a release valve 80 disposed in delivery chamber 68. Diaphragm 79 forms a partition within the casing dividing the control chamber 69 from the exhaust chamber 70. The control chamber 69 is constantly open to the delivery chamber 68 by way of a choke 81, while the exhaust chamber 70 is constantly open to the atmosphere by way of a port 82 in the casing. Diaphragm 79, therefore, is subject opposingly to delivery pressure of fluid in chamber 69 on one side and to atmospheric pressure in chamber 70 on its opposite side. The release valve seat element 78 forms a movable partition between the delivery chamber 68 and the control chamber 69 and prevents direct impingement of fluid under pressure on the diaphragm 79 as same is supplied to said delivery chamber. Choke 81 prevents sudden pressure impulses in chamber 68 from influencing diaphragm deflection. The release valve seat element comprises a portion 83 which may be integrally formed therewith and which extends through a central opening in the diaphragm 79 and into the exhaust chamber 70. A nut 84 may be in screw-threaded attachment with portion 83 for securing element 78 to the diaphragm. A central opening 85 extends from chamber 68 at one end of element 83 to its opposite end opening into exhaust chamber 70. A valve seat may be formed at one end of opening 85 on which the release valve 80 may seat for closing off the delivery chamber 68 from the exhaust chamber 70 via said opening. Release valve 80 is rigidly secured to the supply valve 72 by means of a small rod 86. A bias spring 87 may be provided for urging seat element 71 to follow movement of stem 65. A compression control spring 88 is disposed in the exhaust chamber 70 and arranged to act on diaphragm 79 to oppose action of pressure of fluid in control chamber 69 on said diaphragm. One end of spring 88 abuts a spring seat element 89 carried by a screw-threaded shaft 90 which is adjustable manually to change the precompression of the spring 88 as may be desired to suit operating conditions of the self-lapping valve device.

In the self-lapping valve device 50, the supply chamber 67 is connected to the pipe 40, and the delivery chamber 68 is connected to the pipe 51.

In operation of the self-lapping valve device 50, assume that fluid under pressure is supplied to the supply chamber via the pipe 40 from the magnet valve device 35 for effecting an application of brakes on the wire stranding machine 1. To allow fluid under pressure to flow to the delivery chamber 68, hence to pipe 51, double check valve 52 and pipe 53 to the brake cylinder 26 on the machine 1, the knob 77 is turned to advance stem 65 inwardly of the casing and thereby move seat element 71 in the direction of chamber 68 for unseating the supply valve 72 which is restrained from such movement by engagement of release valve 80 with seat element 78 which is at this time stationary. This may be done initially prior to a brake application as called for by supply of fluid under pressure from magnet valve device 35 in order that said fluid under pressure may flow from the supply chamber 67 in device 50 by way of the unseated supply valve 72, opening 75 in seat element 71, and delivery chamber 68 to the pipe 51. As will hereinafter become obvious, the degree of pressure supplied from delivery chamber 68 to the brake cylinder 26 on the machine 1 is dependent upon the position of the seat element 71 as determined by position of stem 65. Stem 65 may be adjusted during a brake application to increase or decrease the intensity thereof, but in all probability, once said intensity is satisfactory, position of said stem will not be changed during subsequent applications.

Fluid under pressure supplied to the supply chamber 67 will flow via ports 74, cavity 73 past valve 72 and opening 75 in seat element 71 into the delivery chamber 68, pipe 51, double check valve 52, pipe 53 and pressure chamber 29 in the brake cylinder 26 on the machine 1 where the pressure of said fluid increases as such flow continues. Increasing pressure of fluid in delivery chamber 68 is reflected in the control chamber 69 by way of choke 81. When pressure of delivery fluid in control chamber 69 acting on diaphragm 79 increases sufficiently to overcome the initial compression of the control spring 88, said diaphragm will start deflecting with the continued increase in said pressure in the direction of the exhaust chamber 70 against opposing action of said spring. This deflection of diaphragm 79 carries with it the release valve seat element 78. By action of spring 76 in seat element 71, the release valve 80 remains seated on seat element 78 and follows movement thereof, as does the attached supply valve 72, which movement advances said supply valve toward its seat on said element 71. When supply valve 72 reseats on element 71 and thus closes off supply chamber 67 from delivery chamber 68, further increase in pressure of fluid in said delivery chamber is prevented. The degree of pressure established in the delivery chamber 68 will depend upon the distance the supply valve travels before it reseats once the diaphragm starts to deflect. Delivery pressure may be increased substantially in direct proportion to the distance that the seat in seat element 71 is disposed away from supply valve 72, as determined by adjusted position of stem 65.

If a subsequent decrease in pressure of fluid in the delivery chamber 68 is desired for effecting a corresponding reduction in intensity of a brake application on machine 1, the stem 65 may be screwed outwardly of the casing. As stem 65 is thus moved outwardly of the casing, spring 87 urges seat element 71 to follow such movement and carries supply valve 72 and attached release valve 80 with it. Release valve 80 is thus carried away from seat element 78 a distance equal to movement of stem 65 and in moving away therefrom uncovers the opening to passage 85, allowing fluid under pressure in chamber 68 to flow through said passage into chamber 70 to atmosphere via port 82. Pressure of fluid in chamber 68 and control chamber 69 connected thereto is thus reduced. Reduction in pressure of fluid in the control chamber 69 acting on diaphragm 79 allows the spring 88 to deflect said diaphragm in the direction of said control chamber, carrying seat element 78 with it toward the unseated release valve 80. Seat element 78 finally engages release valve 80, reseating same and again closing off the delivery chamber 68 from the exhaust chamber 70 via opening 85 and thus preventing a further reduction in pressure of fluid in said delivery chamber. The degree of reduction in pressure thus effected will depend upon the distance that the release valve 80 is moved away from seat element 78 as determined by outward movement of stem 65 and will vary substantially in direct proportion thereto.

The self-lapping valve device 50 is operative automatically to maintain any particular pressure of fluid in its delivery chamber 68 as called for by position of stem 65. For example, should pressure of fluid in delivery chamber 68 drop below its desired value as called for by position of stem 65, due to leakage therefrom via any pipes connected thereto or for any other reason, such reduction in pressure reflected in the control chamber 69 will allow control spring 88 to deflect diaphragm 79 upwardly, as viewed in the drawing. As previously described, this upward movement of the diaphragm carries with it seat element 78 and valves 80, 72, the latter of which is thereby unseated from seat element 71 which is restrained from such movement by its contact with stem 65. Unseating of supply valve 72 allows fluid under pressure from the supply chamber 67 to flow via opening 75 in seat element 71 into the delivery chamber to reestablish the original pressure condition therein. When the original pressure condition in delivery chamber 68 has again thus been reestablished, through action of fluid at delivery pressure in control chamber 69 in deflecting diaphragm 79 downwardly, the spring 76 will have reseated supply valve 72 on seat element 71 to prevent further increase in said pressure above the desired value.

The converse is also true, should pressure of fluid in the delivery chamber 68 tend to increase above the value determined by position of stem 65, such increase in pressure in control chamber 69, connected to chamber 68, acting on diaphragm 79 will deflect same downwardly, pulling seat element 78 away from release valve 80 and allowing said undesirable increase in pressure of fluid in chamber 68 to reduce by way of opening 85, exhaust chamber 70 and port 82. When the desired value of pressure of fluid in delivery chamber 68 is thus again reestablished, through consequent upward deflection of diaphragm 79, the seat element 78 again will have contacted the release valve 80 to again close off said delivery chamber from the exhaust chamber 70 by way of opening 85.

It will thus be seen that upon supply of fluid under pressure to the supply chamber 67 of the self-lapping valve device 50 from the magnet valve device 35, said device 50 will respond to effect delivery of said fluid to the brake cylinder 26 on machine 1 at a pressure in accordance with position of stem 65. This pressure in the brake cylinder 26 may be increased or decreased, before or during a brake application, by adjustment of stem 65 as desired. The device 50 is also operative to maintain, automatically, any pressure of fluid called for by position of stem 65 during a brake application.

When fluid under pressure in supply chamber 67 in the self-lapping valve device 50 is vented to atmosphere via pipe 40 and magnet valve device 35 for release of brakes on the machine 1, fluid under pressure in the pressure chamber 29 in brake cylinder 26 on machine 1 will release to atmosphere via pipe 53, check valve device 52, pipe 51, delivery chamber 68 and supply chamber 67 in the self-lapping valve device 50. At time of release of fluid under pressure from the supply chamber 67 in self-lapping valve device 50, the supply valve 72 will be seated, but due to preponderance of pressure of fluid in delivery chamber 68 acting on the underside of said valve exposed thereto in opening 75, action of light bias spring 76 will be overcome and said valve unseated, whereby release of fluid under pressure from the brake cylinder is effected as above described.

The brake control apparatus further comprises a magnet valve device 95, similar to magnet valve device 35, which, when deenergized, establishes a fluid pressure communication, indicated by the solid line 36, between a branch of the fluid pressure supply pipe 44 and a pipe 97, and when energized effects venting of said pipe 97 via a communication indicated by the dashed line 38 to the pipe 41 open to atmosphere. Pipe 97 has a connection with the supply chamber 67 of a self-lapping valve device 98 which is similar to self-lapping valve device 50. The delivery chamber 68 of self-lapping valve device 98 is connected via a pipe 99 to the brake cylinder 26 on the wire stranding machine 2. One of poles 37 of magnet valve device 95 is connected to ground while the opposite pole 37 is connected via a wire 100 to a wire 101 connected to the driving motor 4 of the machine 2 for conducting supply of electrical energy thereto.

It will be seen, therefore, that magnet valve device 95 will be energized when motor 4 on machine 2 is supplied with electrical energy and is running and will be deenergized when supply of said electrical energy to said motor is terminated.

In fashion similar to that previously described in regard to action of magnet valve device 35 and self-lapping valve device 50, when the motor 4 on the machine 2 is running, the magnet valve device 95 is energized and the brakes on said machine are released, the pressure chamber 29 in brake cylinder 26 being vented to atmosphere via pipe 99, the self-lapping valve device 98, the pipe 97, a communication 38 in magnet valve device 95 and the pipe 41. When supply of electrical energy to motor 4 on the machine 2 is terminated and magnet valve device 95 is at the same time deenergized, an automatic application of brakes on the machine 2 is effected through supply of fluid under pressure from supply pipe 44, communication 36 in magnet valve device 95, pipe 97, the self-lapping valve device 98, and the pipe 99 to the pressure chamber 29 in brake cylinder 26 on said machine. As was true of the self-lapping valve device 50, the self-lapping valve device 98 is operable to regulate the pressure of fluid thus supplied to the brake cylinder in accordance with position of its stem 65 and will maintain said pressure automatically should same tend to increase or decrease. Through self-lapping valve device 98, therefore, the degree of any application of brakes on the machine 2 may be regulated, prior to and/or at the time of said application.

It will now be seen that means are provided in the brake control apparatus which automatically will control application of brakes on either or both of the wire stranding machines when same are operating as independent individual units.

When the two wire stranding machines are operating in tandem, for which they may be set up as shown in the drawing, the magnet valve device 35 is rendered ineffective to control application of brakes on the machine 1 and the magnet valve device 95 is rendered effective to control automatic application of brakes on both machines. Magnet valve device 95 is rendered effective to control application of brakes on both machines by connecting a branch of pipe 97 through a relay valve device 105, a pipe 106, a self-lapping valve device 106, and a pipe 107 connected to the double check valve 52. Magnet valve device 35 is rendered ineffective to control application of brakes on machine 1 by cutting off the supply pipe 44 from the pipe 39 and at the same time venting said pipe 39 to atmosphere via relay valve device 42. It will be seen, therefore, that while magnet valve device 35 may continue to operate, pipe 40 and hence pipe 51, will remain open to atmosphere via said magnet valve and either pipe 41 or the now vented pipe 39. With pipe 51 vented to atmosphere, any fluid under pressure supplied to pipe 107 from the magnet valve device 95 will flow via double check valve 52 and pipe 53 to the brake cylinder 26 on machine 1. Double check valve 52 will at the same time prevent such fluid under pressure supplied to pipe 107 from flowing into the pipe 51.

To assure that the brakes on the two wire stranding machines will be applied and released in unison, with magnet valve device 95 controlling operation of said brakes and being energized when electric current is supplied to wire 101 for running motor 4 on machine 2 and deenergized when said current is cut off, means are provided for controlling operation of the motors on the two machines which assures supply and termination of electric current to said motors simultaneously when operating in tandem. Such means may be in the form of an operator's controller device 110 which is operable by movement of a handle 111 to a plurality of positions corresponding to operating condtions of the two wire stranding machines 1, 2, such as, "off," "individual," and "tandem," which positions are indicated by dot-and-dash lines so titled. In Fig. 4 the electrical connections made by the controller device 110 are shown schematically for various positions of handle 111. A battery 112, one pole of which may be connected via a wire 113 to ground while its opposite pole may be connected to controller device 110, may serve as a source of electrical energy for operating the driving motors 4 on the two machines as well as serving to energize the various magnet valve devices in the system. Referring to Figs. 1 and 4 in "individual" position of handle 111, the controller device 110 connects the wire 114 to two wires 115, 116 leading to one side of respective switch devices 117, 118, the opposite sides of which switch devices are connected to the wires 56, 101 respectively, leading to the motors 4 on the two wire stranding machines. In "individual" position of handle 111, with wire 114 connected to wires 115, 116, by closing and opening switch devices 117, 118 operation of the motors 4 on wire stranding machines 1, 2 may be controlled independently of one another for individual operation of said machines. In "tandem" position of the handle 111, the controller device 110 connects wire 114 to both wires 56, 101 for effecting supply of electrical energy simultaneously to the motors 4 on both of the wire stranding machines 1, 2 to correspond with their operation in tandem. With such an arrangement, switches 117, 118 are rendered ineffective in "tandem" position of handle 111, to control individual operation of either of the motors 4 so that it matters not whether wires 115, 116 are connected or disconnected from wire 114, but as indicated in Fig. 4 said wires may be assumed to be disconnected in said "tandem" position. In "off" position of handle 111, the controller device 110 disconnects the wire 114 from wires 115, 116, 56, 101 so that upon subsequent movement thereto from "tandem" position, for example, supply of electrical energy to motors 4 in both machines 1, 2 is terminated simultaneously.

A magnet valve device 120, similar to magnet valve device 35, is provided in the brake control apparatus for controlling operation of the relay valve device 42. Magnet valve device 120 is operable to a position when energized to connect a branch of supply pipe 44 via its communication 38 to a fluid pressure control pipe 121, which is connected via a double check valve 122 and a control pipe 123 to the relay valve device 42. When deenergized, magnet valve device 120 connects pipe 121 to atmosphere via communication 36 and pipe 41. The relay valve device 42 may be of any well-known type and is operative in response to pressure of fluid supplied from the magnet valve device 120 to control pipe 123 to connect the supply pipe 44 to the pipe 39 via a communication indicated by the dashed line 125 for effecting supply of fluid under pressure to the magnet valve device 35 when the wire stranding machines are operating as individual units as previously described. Relay valve device 42 is operative, upon release of fluid under pressure from control pipe 123 via check valve 122, pipe 121 and the deenergized magnet valve device 120, to disconnect pipes 44, 39 and to connect the latter pipe to atmosphere via a communication indicated by a solid line 126 and a pipe 127, as is desired when the two wire stranding machines are operating in tandem as was previously pointed out. To assure that the magnet valve device 120 will be energized for individual operation of machines 1, 2 and deenergized for tandem operation of said machines, one of poles 37 of device 120 may be connected to ground, while the opposite of said poles may be connected via a wire 128 to the controller device 110. As indicated in Fig. 4, wire 128 will be connected to wire 114 for supplying electrical energy from battery 112 to energize magnet valve device 120 when handle 111 of said controller device 110 is in "individual" position, and said wire 128 will be disconnected from said wire 114 for deenergizing said magnet valve device 120 when handle 111 is in "tandem" position.

For controlling operation of relay valve device 104, a magnet valve device 129 is provided, which is similar also to magnet valve device 35. Magnet valve device 129 is operative when deenergized to connect a branch of the pipe 39 via its communication 36 to a control pipe 130 having a connection with relay valve device 104. Control pipe 130 also has a connection with one side of the double check valve 122 for reasons which will hereinafter become obvious. When energized, magnet valve device 129 disconnects pipe 39 from pipe 130 and connects the latter pipe to atmosphere via communication 38 and pipe 41. The relay valve device 104 is similar to relay valve device 42 and is operative, in response to supply of fluid under pressure to pipe 130 from the deenergized magnet valve device 129, to connect the pipe 105 to atmosphere via the communication 125 and a pipe 131, corresponding to individual operation of machines 1, 2 as previously described. When the control pipe 130 is vented to atmosphere via the energized magnet valve device 129, the relay valve device 104 is operative to disconnect pipe 131 from pipe 105 and to connect the latter pipe via communication 126 to the pipe 97 in accord with tandem operation of the two machines. To properly correlate energization and deenergization of magnet valve device 129 with type of operation of the wire stranding machines 1, 2, one of poles 37 of said magnet valve device may be connected via a wire 132 to the controller device 110 and its energization controlled thereby. The opposite of poles 37 may be connected to ground to allow for completion of an electrical circuit when electrical energy is supplied via wire 132. As indicated in Fig. 4, when handle 111 is in "individual" position, wire 114 via controller device 110 will be disconnected from the wire 132 and the magnet valve device 129 will be deenergized when the machines 1, 2 are operating individually, as desired. When handle 111 is in "tandem" position, the controller device 110 connects the wire 114 to the wire 132 for supplying electrical energy from battery 112 to magnet valve device 129 to energize same when machines 1, 2 are operating in tandem.

According to another feature of the invention, once the brake control apparatus is set up for individual or tandem operation of the wire stranding machines 1, 2, even though supply of electrical energy to the controller device 110 via wire 114 should fail, for any reason whatsoever, the brake control apparatus will automatically effect braking of said machines in accord with their mode of operation, i. e., individually or in tandem.

For example, assume that in normal operation handle 111 in controller device 110 is in "individual" position to agree with independent individual operation of the two wire stranding machines. In this case, either or both of the motors 4 may be in operation, either or both magnet valve devices 35, 95 may be energized depending on whether or not the respective motors 4 are being supplied with electrical energy, magnet valve device 120 is energized and magnet valve device 129 is deenergized, as will be understood from previous description. Fluid under pressure from the supply pipe 44 is supplied to the magnet valve device 95 by way of said supply pipe. Fluid under pressure is at the same time supplied via communication 38 in the energized magnet valve device 120, pipe 121, one side of double check valve device 122, and control pipe 123 to relay valve device 42, so that pipe 44 is connected via communication 125 in said relay valve device to pipe 39, thence to magnet valve devices 35, 129. Fluid under pressure in pipe 39 is supplied via communication 36 in the deenergized magnet valve device 129 to the pipe 130 connected to relay valve device 104 and to the opposite side of double check valve 122. In response to fluid under pressure supplied to pipe 130, relay valve device 104 will cut off pipe 97 from pipe 105 and connect said pipe 105 to atmosphere via communication 125 and pipe 131 to prevent interference from magnet valve device 95 in controlling operation of brakes on machine 1 when same is operating as an individual unit. The brake control apparatus is now set up for automatic control of brakes on the two wire stranding machines as individual units, i. e., magnet valve device 35 is effective to control operation of brakes on the machine 1 and magnet valve device 95 is effective to control operation of brakes only on the machine 2.

Now assume that power supply to the system fails, i. e., supply of electrical energy by wire 114 to the controller device 110 fails for some reason, all magnet valve devices in the brake control apparatus become deenergized, including magnet valve device 120 previously energized for rendering said apparatus effective to control braking the two machines individually. In manner as previously described, magnet valve devices 35, 95 will respond to such unintentional deenergization, if same were previously energized, to effect an application of brakes on either or both machines 1, 2 according as whether either or both of said machines was running at the time of accidental power loss. As the same time, accidental deenergization of magnet valve device 120 automatically disconnects pipe 121 from the supply pipe 44 and vents the latter pipe 121 to atmosphere via communication 36 and pipe 41. Fluid under pressure in the control line 123 connected to relay valve device 42 is prevented from escaping to atmosphere via pipe 121, however, by action of pressure of fluid in pipe 130 on double check valve 122. The preponderance of pressure on one side of the double check valve 122 in pipe 130 causes movement thereof to close off pipe 121 from said pipe 130 and from the control pipe 123. Relay valve device 42 remains positioned for individual operation of the machines, as does the relay valve device 104, since pipes 123, 130 remain pressurized and unaffected by the accidental loss of electrical power to the system. Upon reestablishment of electrical power to the system via wire 114 to the controller device 110 in its "individual" position, the brake control apparatus will be properly conditioned for control of brakes on the two machines in accord with their mode of operation. Magnet valve device 120 again will be energized and fluid under pressure supplied, as under normal conditions, to pipe 121.

Now assume that the brake control apparatus is set up for tandem operation of the two wire stranding machines, as previously described. Handle 111 of operator's controller device 110 will be in "tandem" position. Magnet valve device 129 will be energized and magnet valvet device 120 deenergized. As previously described, pipe 130 connected to relay valve device 104 is vented to atmosphere via the energized magnet valve device 129 and pipe 41 to connect pipes 105, 97 via said relay valve device for rendering the magnet valve device 95 effective to control application of brakes on both machines. Pipe 39 connected to magnet valve devices 35, 129 is connected to atmosphere via the relay valve device 42 and pipe 127 to render said relay valve device 35 ineffective to control brake operation on machine 1. Now should supply of electrical power or energy to the system fail, such as supply to wire 114, magnet valve device 129 will become deenergized and pipe 130 then disconnected from exhaust pipe 41 in said magnet valve device and connected to pipe 39 which remains vented to atmosphere via relay valve device 42, so that the status of said relay valve device and the relay valve device 104 will remain unchanged by such accidental power loss in absence of a change in conditions in pipe 130, 123, the latter pipe remaining vented to atmosphere via either pipe 130 or 131. At time of such accidental power loss, therefore, the magnet valve device 95 will respond to its resultant deenergization to effect an automatic application of brakes on both machines simultaneously, as will be obvious from previous description. Upon subsequent reestablishment of electrical power to the system, the brake control apparatus, it will be seen, will be properly conditioned to control operation of the brakes on the two machines in accord with their tandem operation. The magnet valve device 129 again will become energized to vent pipe 130 locally by way of pipe 41.

Thus it will be seen that even though supply of electrical power to the system should fail, the brake control apparatus will remain set up as intended, according to mode of operation of the two wire stranding machines.

In accordance with another feature of the invention the brake control apparatus is provided with slack measuring means arranged to adjust the self-lapping valve device 106 in accordance with the tendency for change of slack in the cable traveling between the two machines. Through this adjustment of the self-lapping valve device 106, pressure supplied to brake cylinder 26 on machine 1, and hence the degree of application of brakes thereon, is varied to increase or decrease the deceleration of said machine according as said slack is tending to increase or decrease, respectively, for maintaining said slack substantially constant.

The self-lapping valve device 106 is substantially similar to the self-lapping valve device 50, previously described, with the exception that stem 65 may be attached to seat element 71, and is not in screw-threaded engagement with the casing but is slidably disposed in an accommodating opening in the casing, and is provided with a roller follower 140 carried on the outer projecting end thereof in place of the knurled knob or handle 77 on stem 65 in device 50. The self-lapping valve device 106, therefore, will respond, in manner similar to that previously described in regard to self-lapping valve device 50, to regulate and maintain pressure of fluid in its delivery chamber 68 in accord with position of stem 65 when its supply chamber 67 is charged with fluid under pressure from reservoir 43.

The slack measuring means may comprise a roller 141 arranged to be urged into rolling contact with the cable $x$ traveling between the two machines operating in tandem by a fluid pressure cylinder device 142. Roller 141 may be rotatably mounted on a shaft 143 carried on one end of an arm 144 the opposite end of which may be pivotally secured at 145 to a fixed element 146. Two spaced apart rollers 147, 148 may be provided, at opposite sides of roller 141, rotatably mounted on respective fixed elements 149, 150 to back up and guide cable $x$ leaving machine 1 before engagement with roller 141, and after said engagement and before entering machine 2. By engagement of roller follower 141 with cable $x$, said cable is maintained taut. Any slack in cable $x$ is gathered between rollers 147, 148 by action of roller 141. As slack in cable $x$ tends to increase, roller 141 tends to move upwardly, as viewed in the drawing, in maintaining said cable taut. A normal amount of slack is maintained in cable $x$, so that as slack in said cable tends to decrease from said normal amount, the roller 141 will tend to be displaced downwardly, as viewed in the drawing.

Downward movement of roller 141 will cause pivotal movement of arm 144 in a clockwise direction, while upward movement of said roller will cause pivotal movement of said arm in a counterclockwise direction. A cam 151 is secured for pivotal movement with arm 144 and so adapted and arranged, through engagement with roller follower 140, as to displace stem 65 of a self-lapping valve device 106 inwardly when said pivotal movement is counterclockwise and allow for its outward movement when said pivotal movement is clockwise. Or in other words, when slack in cable $x$ tends to increase, through actuation of cam 151, the stem 65 is moved inwardly to call for increased brake application on machine 1 by increasing pressure of fluid in the brake cylinder thereon by the self-lapping valve device 106, and to allow said stem to move outwardly to effect a decrease in said brake application force when said slack tends to decrease. By increasing and decreasing brake application force on machine 1 relative to that on machine 2, according to tendency for slack in cable $x$ to vary, said slack is automatically maintained substantially constant during application of brakes on the two machines when operating in tandem and thus prevents excessive slack formation and generation of excessive tension forces in said cable.

The fluid pressure cylinder device 142 for urging roller 141 into engagement with cable $x$ may comprise a hollow casing 152 divided interiorly into two parts by a partition 153 and closed at opposite ends by end walls 154, 155, respectively. One part of casing 152 may contain a piston 156 slidably disposed therein and forming a movable abutment between a fluid pressure chamber 157 at one side adjacent partition 153 and a spring chamber 158 at its opposite side adjacent to end wall 154. Piston 156 is provided with a piston rod 159 which extends through a suitable opening in end wall 154 and is pivotally attached at 160 to arm 144. Chamber 157 is adapted to be supplied with fluid under pressure via a pipe 161 from the delivery chamber 68 of a self-lapping valve device 162, similar to self-lapping valve device 50. Chamber 158 is open to the atmosphere via a port 163 in casing 152, so that when chamber 157 is charged with fluid under pressure, the pressure of said fluid acting on piston 156 through rod 159 and arm 144 causes roller 141 to be urged against cable $x$. Piston 156 is normally disposed substantially equidistant its opposite extreme limits of travel as defined by contact with wall 154, in one direction, and with partition 153 in the opposite direction, so that roller 141 is free to travel upwardly or downwardly as slack in cable $x$ may tend to change. The supply chamber 67 of the self-lapping valve device 162 is connected to the fluid pressure supply pipe 44 and said device is operative in accordance with adjustment of its stem 65 to regulate pressure of fluid supplied to chamber 157 in cylinder device 142, hence to regulate the force exerted by roller 141 on cable $x$, as may be desired. Since self-lapping valve device 162 will maintain pressure of delivery fluid, regardless of any tendency for same to change, in accord with position of its stem 65, once said position is set, pressure of fluid in chamber 157 in cylinder device 142 will not vary substantially, even with changes in position of piston 156 with that of roller 141, so that the force exerted by said roller on cable $x$ may be set and maintained substantially constant. Fluid pressure cylinder device 142 is provided with damping means to prevent overcompensation of automatic brake application control on machine 1 due to effect of momentum in movement of elements in the slack measuring mechanism. The damping means provided comprises a piston 164 disposed within the other part of casing 152 and dividing said part into two chambers 165, 166 adjacent to partition 153 and wall 155, respectively. Piston 164 is secured for movement with piston 156, and thereby indirectly with arm 144 and roller 141, by means of a piston rod 167. Chambers 165, 166 are adapted to be filled with an incompressible fluid, such as oil or water, and a choke 168 is provided piston 164 opening between said chambers. Movement of piston 156 cannot transpire unless fluid in one or the other of chambers 165, 166 is forced through choke 168 in piston 164 attached to said piston 156. Since choke 168 offers resistance to flow of fluid therethrough movement of piston 156 and attached elements is thereby dampened.

A still further feature of the invention is the provision of protective means operative automatically to effect emergency supply of fluid under pressure to the brake control apparatus for assuring proper operation of same in event of failure of supply of fluid under pressure from the normal fluid pressure source.

The protective means comprises an emergency reservoir 170 adapted to store fluid under pressure for emergency use only. Reservoir 170 is connected to the supply pipe 44 via a pipe 171 and thereby is adapted to receive fluid under pressure from the normal source thereof, i. e., the pipe 43. A check valve 172 is inserted in pipe 171 to prevent backflow of fluid under pressure from reservoir 170 through said pipe 171 into supply pipe 44. A relay valve device 173, substantially similar to relay valve device 42, is provided adapted and arranged to connect a branch pipe 174 of pipe 171 via communication 126 to the supply pipe 144 in response to a certain reduction in pressure of fluid in pipe 175 connected via a pipe 176 to the normal supply pipe 43. When pipe 43 is adequately pressurized, pressure of fluid in pipe 175 maintains relay valve device 173 positioned to connect pipe 44 to communication 125 therein which, unlike relay valve device 42, is closed by a plug 177 to prevent leakage of fluid under pressure therefrom. A check valve 178 is inserted in pipe 44 between its connection with relay valve device 173 and the pipe 43. Check valve 178 allows for normal supply of fluid under pressure from pipe 43 through pipe 44 to the brake control apparatus, but prevents backflow of fluid under pressure from said brake control apparatus into said pipe 43. The protective means is further provided with signal means in the form of a bell 179 to be located at any convenient station. Bell 179 is arranged to be rendered operative by a fluid pressure switch device 180 upon a certain undesired reduction in pressure of fluid in pipe 43, as reflected in pipe 176, and inoperative while said pressure is maintained above a certain normal level. The bell 179 may be of any well-known type adapted to create a ringing sound upon completion of an electrical circuit through its terminals 179'. One of terminals 179' may be connected to ground while the opposite of said terminals may be connected by a wire 180' to one of two terminals 181 of the fluid pressure switch device 180, the opposite of which two terminals may be connected to wire 114 and thereby the battery 112 as a source of supply of electrical energy. Fluid pressure switch device 180 may comprise a piston 182, reciprocable therein and subject opposingly to pressure of fluid in pipe 176 and of a return spring 183. A contact element 184 is secured for movement with piston 182 and adapted to cooperate with terminals 181 in a closed position for connecting wires 114, 180' and in an open position away from said terminals to disconnect said wires. Element 184 normally is held in open position by action of pressure of fluid on piston 182, while said pressure of fluid in pipe 176, hence pipe 43, is maintained at a normal level and automatically assumes, by action of spring 183, closed position upon a certain undesirable reduction in said pressure.

Summary

Briefly, according to the invention, for controlling braking of the two wire stranding machines when operating as independent individual units, means are provided which automatically will effect an application of brakes on a respective machine when supply of electrical energy to its driving motor is cut off, intentionally or otherwise.

For controlling braking of the two wire stranding machines when operating in tandem, the brake control apparatus is provided with means which automatically will effect an application of brakes on both of said machines when supply of electrical energy to their driving motors simultaneously is cut off, intentionally or otherwise. The brake control apparatus also comprises means for automatically effecting adjustment of the degree of braking of one of the two wire stranding machines when operating in tandem to assure that excessive slack or tension in the cable traveling between said machines will not be generated.

Emergency protective means are provided operative automatically to assure supply of fluid under pressure to the brake control system should the normal source of said fluid under pressure fail.

Having now described the invention, what we claim as new and desire to secure by Letters Patent, is:

1. Control apparatus for a pair of rotatable elements comprising an individual motor for operating each of said elements, individual fluid pressure operable brake means for each of said elements, a source of fluid under pressure, an individual magnet valve device for each brake means for establishing a communication for supplying fluid under pressure from said source to the respective brake means upon energization thereof and for opening the respective brake means to atmosphere upon deenergization thereof, operator's control means having one position for rendering the two motors independently operable, another position for effecting operation of said motors in unison and a third position for rendering said motors ineffective and comprising means for energizing both of said magnets in said one and other position and for deenergizing same in said third position, valve means controlling communication between said source and one of said magnet valve devices controlled by said operator's control means and operative in said one position to open such communication and in said other position to close the communication, and other valve means controlling communication between the other magnet valve device and the brake means for the non-respective rotatable element also controlled by said operator's control means and operative in said one position to close the communication and in said other position to open the communication.

2. In a wire stranding machine, the combination with an electrical source and a fluid pressure source, of a rotatable element, electric motor means operable to rotate said rotatable element, switch means for effecting establishment and termination of supply of electrical energy from said electrical source to said motor means, fluid pressure operable brake means for braking said rotatable element, magnet valve means, a fluid pressure communication connecting said magnet valve means with said brake means, said magnet valve means being responsive upon said termination to effect supply of fluid under pressure from said fluid pressure source through said communication to said brake means and responsive upon said establishment to effect release of said fluid under pressure from said brake means through said communication, and self-lapping valve means interposed in said communication for regulating the pressure of fluid supplied to said brake means.

3. Brake control apparatus for controlling operation of brakes on two wire stranding machines adapted to be operated individually or in tandem, comprising first and second brake control means, and means operative when said two wire stranding machines are operating individually to render said first and second brake control means effective to control operation of brakes on said two wire stranding machines respectively and operative when said two wire stranding machines are operating in tandem to render said first brake control means ineffective and said second brake control means effective to control operation of brakes on both of said two wire stranding machines, and means operable when said two wire stranding machines are operating in tandem to automatically regulate the degree of braking of one of said machines relative to the other to assure substantially equal rates of deceleration of both machines.

4. Brake control apparatus for controlling operation of brakes on two wire stranding machines adapted to be operated in tandem in which wire cable formed in one machine is fed continuously into the other machine, in combination, brake control means operative to control application of brakes on both of said wire stranding machines, adjustable means for controlling the degree of said application on one of said machines, slack measuring means for measuring slack in the cable traveling between said machines, and means operable by said slack measuring means for adjusting said adjustable means.

5. Brake control apparatus for controlling application of brakes on two tandem arranged wire stranding machines operable by electric motor means and in which cable formed in one machine is fed continuously into the other machine, in combination with an electrical source and a fluid pressure source, of switch means for effecting establishment and termination of supply of electrical energy to said motor means, magnet valve means responsive upon said termination to effect supply of fluid under pressure from said fluid pressure source to brakes on said machines for effecting application thereof, adjustable self-lapping valve means for regulating pressure of fluid supplied to brakes on one of said two machines in accordance with adjustment of said self-lapping valve means, and means for effecting adjustment of said adjustable self-lapping valve means in accordance with slack in said cable extending between said machines.

6. In brake control apparatus for controlling operation of fluid pressure brakes on two wire stranding machines adapted to operate in tandem and in which cable formed on one machine is fed continuously into the other machine, in combination with a source of fluid under pressure, of fluid pressure control means operable to effect supply of fluid under pressure from said source to said fluid pressure brakes, adjustable regulating means for regulating pressure of fluid supplied to the fluid pressure brakes on said one machine, cam means adapted to be positioned to adjust said adjustable regulating means, and slack measuring means for positioning said cam means in accordance with changes in amount of slack in said cable, said slack measuring means comprising a roller element arranged for rolling engagement with said cable and operatively connected to said cam means, fluid pressure cylinder means for urging said roller element against said cable, and adjustable pressure regulating means for regulating pressure of fluid supplied from said source to said fluid pressure cylinder means.

7. Brake control apparatus for controlling application of first and second fluid pressure brake means, respectively, on two wire stranding machines adapted to be operated individually or in tandem, comprising in combination, with a source of fluid under pressure, a first fluid pressure communication open to said first fluid pressure brake means, a second fluid pressure communication open to said second fluid pressure brake means, first fluid pressure control valve means operative to connect said first fluid pressure communication to a fluid pressure supply conduit, second fluid pressure control means operative to connect said source to said second fluid pressure communication, first relay valve means operative in response to supply of fluid under pressure to a first control pipe to connect said source to said fluid pressure supply conduit, first interlock valve means operative to connect said source to said first control pipe, second relay valve means operative in response to venting of fluid under pressure from a second control pipe to connect said second fluid pressure communication to said first fluid pressure communication, second interlock valve means normally connecting said second control pipe to said fluid pressure supply conduit and operative to vent said second control pipe to atmosphere, and means operative to effect operation of said first interlock valve means when said two wire stranding machines are set up for individual operation and to effect operation of said second interlock valve means when said two wire stranding machines are set up for tandem operation.

8. Brake control apparatus for controlling application and release of fluid under pressure to and from first and second fluid pressure brake cylinder devices on two wire stranding machines respectively adapted to be operated by first and second electric motors and to be set up in an individual or a tandem arrangement, in combination with a fluid pressure source and an electrical source, of a first fluid pressure conduit connected to said first fluid pressure brake cylinder device, a first double check valve device having one and another fluid pressure inlet and a fluid pressure outlet connected to said first fluid pressure conduit, a first brake control magnet valve device operative upon energization to effect connection of said one fluid pressure inlet to atmosphere and upon deenergization to effect connection between said one fluid pressure inlet and a fluid pressure supply pipe, a second fluid pressure conduit having a connection with said second brake cylinder device, a second brake control magnet valve device operative upon energization to effect connection between said second fluid pressure conduit and atmosphere and upon deenergization to effect connection between said fluid pressure source and said second fluid pressure conduit, first relay valve means operative in response to pressure of fluid in a first control pipe to effect connection between said fluid pressure source and said fluid pressure supply pipe and responsive to atmospheric pressure in said control pipe to effect connection of said fluid pressure supply pipe to atmosphere, a second double check valve device having a first and a second fluid pressure inlet opening and a fluid pressure delivery opening connected to said first fluid pressure control pipe, a first interlock magnet valve device operative upon energization to effect connection between said fluid pressure source and said first fluid pressure inlet opening and upon deenergization to effect connection between said first fluid pressure inlet opening and atmosphere, a second relay valve device operative upon establishment of pressure of fluid in a second control pipe to effect connection between said second fluid pressure conduit and said other fluid pressure inlet opening and upon disestablishment of pressure of fluid in said second control pipe to effect connection of said other fluid pressure inlet opening to atmosphere, a second interlock magnet valve device operative upon energization to effect connection of said second control pipe and said second inlet opening to atmosphere and upon deenergizaation to effect connection of said second control pipe and said second inlet opening to said fluid pressure supply pipe, and means operative when said machines are set up for individual operation to effect supply of electrical energy from said electrical source to said first interlock magnet valve device for energizing same and operative when said machines are set up for tandem operation to terminate said supply to said first interlock magnet valve device for deenergizing same and to effect supply of electrical energy from said electrical source to said second interlock magnet valve device, said first and second brake control magnet valve devices being adapted to be energized and deenergized in accord with supply and termination of electrical energy to said first and second electric motors respectively.

9. In combination, a fluid pressure supply pipe, a fluid pressure control pipe, first check valve means connecting said control pipe directly to said supply pipe and preventing flow of fluid under pressure from said control pipe to said supply pipe, a fluid pressure emergency reservoir, second check valve means connecting said reservoir with said control pipe and preventing flow of fluid under pressure from said reservoir to said control pipe, and relay valve means having a control chamber open directly to said supply pipe operative in response to a certain reduction in pressure of fluid in said control chamber to establish connection between said control pipe and said emergency reservoir.

ROY R. STEVENS.
RALPH C. BROOKS.

REFERENCES CITED

The following references are of record in the file of this patent:

UNITED STATES PATENTS

| Number | Name | Date |
| --- | --- | --- |
| 885,988 | Fishback | Apr. 28, 1908 |
| 1,687,654 | Bouton | Oct. 16, 1928 |
| 1,899,586 | Phillips | Feb. 28, 1933 |
| 2,393,425 | Sexton | Jan. 22, 1946 |